United States Patent
Schmitt et al.

(10) Patent No.: US 7,426,685 B2
(45) Date of Patent: Sep. 16, 2008

(54) DEVICE FOR CONTROLLING AN XDSL COMMUNICATION LINE

(75) Inventors: Jean Schmitt, Rouvres (FR); Dominique Le Foll, Ivydbridge-Devon (FR)

(73) Assignee: Acterna IPMS, Trappes (FR)

( * ) Notice: Subject to any disclaimer, the term of this patent is extended or adjusted under 35 U.S.C. 154(b) by 832 days.

(21) Appl. No.: 10/494,819

(22) PCT Filed: Sep. 9, 2003

(86) PCT No.: PCT/FR03/50049

§ 371 (c)(1),
(2), (4) Date: May 6, 2004

(87) PCT Pub. No.: WO2004/028130

PCT Pub. Date: Apr. 1, 2004

(65) Prior Publication Data
US 2005/0231882 A1    Oct. 20, 2005

(30) Foreign Application Priority Data
Sep. 11, 2002    (FR)    .................................. 02 11241

(51) Int. Cl.
*G06F 7/21*    (2006.01)

(52) U.S. Cl. ...................... 714/821; 379/1.04; 370/242; 370/248

(58) Field of Classification Search ................. 714/712, 714/713, 821; 379/1.04; 370/242, 248
See application file for complete search history.

(56) References Cited

U.S. PATENT DOCUMENTS

| 5,343,463 | A  | * | 8/1994 | van Tetering et al. | ....... 370/253 |
| 6,215,855 | B1 | * | 4/2001 | Schneider | .................... 379/22 |
| 6,385,297 | B2 | * | 5/2002 | Faulkner et al. | ............ 379/1.04 |
| 6,442,493 | B1 | * | 8/2002 | Jurisch et al. | .................. 702/59 |
| 6,594,343 | B1 | * | 7/2003 | Duffie et al. | ............... 379/1.01 |
| 6,606,299 | B1 | * | 8/2003 | Kurosawa et al. | ........... 370/225 |
| 6,870,911 | B2 | * | 3/2005 | Ferianz et al. | ........... 379/93.01 |

FOREIGN PATENT DOCUMENTS

WO    WO 01/10054 A1    2/2001

OTHER PUBLICATIONS

Osamu Maeshima, Yoshihiro Ito, Masami Ishikura and Tohru Asami, "A Method of Service Quality Estimation with a Network Measurement Tool", KDD R&D Laboratores Inc., 1999 IEEE, pp. 201-209.
Johna Till, "Modem Manager Monitos a Variety of Devices", Electronic Design, Jun. 1989, pp. 123-124.

* cited by examiner

*Primary Examiner*—Jacques Louis-Jacques
*Assistant Examiner*—Esaw Abraham
(74) *Attorney, Agent, or Firm*—Pearne & Gordon LLP

(57) ABSTRACT

A device for checking a transmission line carrying a plurality of digital and/or analogue transmission channels is provided. The device includes a measurement block designed to evaluate performances, search for faults and determine the quality of the line and services transmitted through the said line. A system for measuring disturbances is also provided. The system measures disturbances in a transmission line firstly connecting a subscriber to a high speed server through an xDSL modem, and secondly to a switched telephone network.

5 Claims, 3 Drawing Sheets

DEVICE FOR CONTROLLING AN XDSL COMMUNICATION LINE

TECHNICAL DOMAIN

The invention relates to the domain of measurements of disturbances and service quality for xDSL broadband links.

More particularly, the invention relates to a device for checking a transmission line carrying a plurality of digital and/or analogue transmission channels comprising a measurement block designed to evaluate performances, search for faults and determine the quality of the line and services transmitted through the said line.

More particularly, the invention is applicable to a system for measuring disturbances in a transmission line firstly connecting a subscriber to a high speed server through an xDSL modem, and secondly to a switched telephone network.

STATE OF THE PRIOR ART

The pass band of the existing conventional telephone network, limited to 300-3400 Hz, is incapable of transporting high speed applications to subscribers. A first solution to overcome this problem consists of developing an optical fibres network as far as subscriber domiciles. However, this solution was found to be too expensive.

A second solution consisted in doping the existing telephone network over the last kilometers of the transmission. This second solution is possible using xDSL (x Digital Subscriber Line) technologies. This technology consists in transmitting high speed data flows on simple twisted telephone lines using signal processing techniques for increasing the speed, for which the key lies in modulation of the carrier. There are different techniques for processing the carrier as a function of the data to be transmitted, including:

- a CAP (Carrierless Amplitude Modulation) type modulation for coding up to 9 bits per symbol, to transmit the same quantity of information on a reduced frequency band. The carrier is not transmitted in this technique, because it does not contain any information.
- A DMT (Discrete MultiTone) type modulation consisting in sharing the available pass band into a large number of channels each receiving a QAM (Quadrature Amplitude Modulation) type modulation transmitted in parallel.

The different variant of the xDSL technology include:
- HDSL: for High Bit Rate DSL capable of reaching a speed of 2 Mbps over a distance of 3 km;
- SDSL: Single pair or Symmetric DSL capable of reaching a speed of up to 2.3 Mbps over a distance of 3.6 km;
- ADSL: for Asymmetric DSL capable of reaching a down speed of 1544 kbps to 9 Mbps over a distance of 5.4 km, and an up speed of 16 kbps to 640 kbps over a distance of 5.4 km;
- VDSL: for Very High data DSL capable of reaching a down speed of 13 Mbps to 55.2 Mbps over a distance of 5.4 Km, and an up speed of 0.128 Mbps to 1 Mbps over a distance of 1.3 km.

With reference to FIG. 1, an ADSL link comprises an item of multiplexing equipment 2 called DSLAM (Digital Subscriber Line Access Multiplexer) for multiplexing ATM flows exchanged with the high speed network to the transport network, a switching filter 4 called a "splitter" to separate the pass band reserved for use by the telephone service from the pass band for use by the high speed transmission. This filter 4 provides sufficient splitting to prevent signals transmitted on one of the frequency bands from disturbing operation of the other. The splitter 4 is connected to the telephone network through a public switch 6 and to the high speed network through the DSLAM 2. At the user end, a second splitter not shown retrieves the signals transmitted in the frequency pass band used for the ADSL transmission and transmits them to an ADSL modem connected to a local network or to an item of digital processing equipment such as for example a computer, and signals transmitted in the frequency pass band used for voice transmission.

A TAMS (Test Access Matrix Switch) connection matrix 8 is arranged between the splitter 4 and the local loop 10 through a cross connect frame 12. The connection matrix 8 is connected to a measurement module 14 designed to evaluate performances, search for faults and test the transmission line and services supplied through this line.

A major problem in the prior art is due to the fact that when the communication line is being checked, known devices make it necessary to interrupt the broadband link and the narrow band link. It might be preferable to maintain a telephone communication while this check is being carried out on the broadband link only, and it may be desirable to maintain a broadband link if the check is applied only to the telephone channel carrying voice.

The purpose of the invention is to compensate for inadequacies in the prior art using a device that enables selective checking of one or more transmission channels without interrupting other channels not being checked.

PRESENTATION OF THE INVENTION

The invention relates to a device for checking a transmission line transporting a plurality of digital and/or analogue transmission channels comprising a measurement block designed to test the quality of the line and transmitted services.

According to the invention, this device also comprises a switching module capable of selectively connecting the measurement block only to the transmission channels to be checked and to keep other channels in the transmission line active.

In one particular application of the invention, the said transmission line comprises at least one first broadband transmission channel connecting at least one subscriber to a digital data server and at least one second narrow band transmission channel connecting the said subscriber to a telephone network.

In one embodiment of the invention, the broadband transmission channel is of the xDSL type and the narrow band transmission channel is a digital or analogue telephone line.

In this case, the device according to the invention is used to check broadband channels without interrupting the "telephone" channel that may be analogue reserved for voice, fax or data transmission, or an ISDN type digital transmission or any other service transported within the frequency band less than 20 kHz. This device also checks the "telephone" channel without disturbing broadband channels.

Preferably, the said switching module comprises a programmable filter capable of selectively connecting the measurement block only to the broadband transmission channel and maintaining a link with the local loop only through the broadband transmission channel; similarly, it is capable of selectively connecting the measurement block only to the narrow band transmission channel and maintaining a link with the local loop only through the narrow band transmission channel.

The invention also relates to a process for checking a transmission line carrying a plurality of digital and/or analogue transmission channels consisting in selectively connecting a measurement block 14 only to the broadband transmission channel and maintaining a link with the local loop only through the broadband transmission channel; similarly, it is capable of selectively connecting the measurement block 14 only to the narrow band transmission channel and maintaining a link with the local loop only through the narrow band transmission channel.

BRIEF DESCRIPTION OF THE DRAWINGS

Other characteristics and advantages of the invention will become clear after reading the following description given as a non-limitative example, with reference to the attached figures in which.

DETAILED PRESENTATION OF PARTICULAR EMBODIMENTS

The following description relates to an application of the invention in the transmission line firstly connecting a subscriber to an IP type high speed network, and secondly to a public switched telephone network STN through an ADSL link.

In the remainder of the description, identical numeric references will be used to denote elements common to devices according to the prior art and devices according to the invention.

Figure 1:
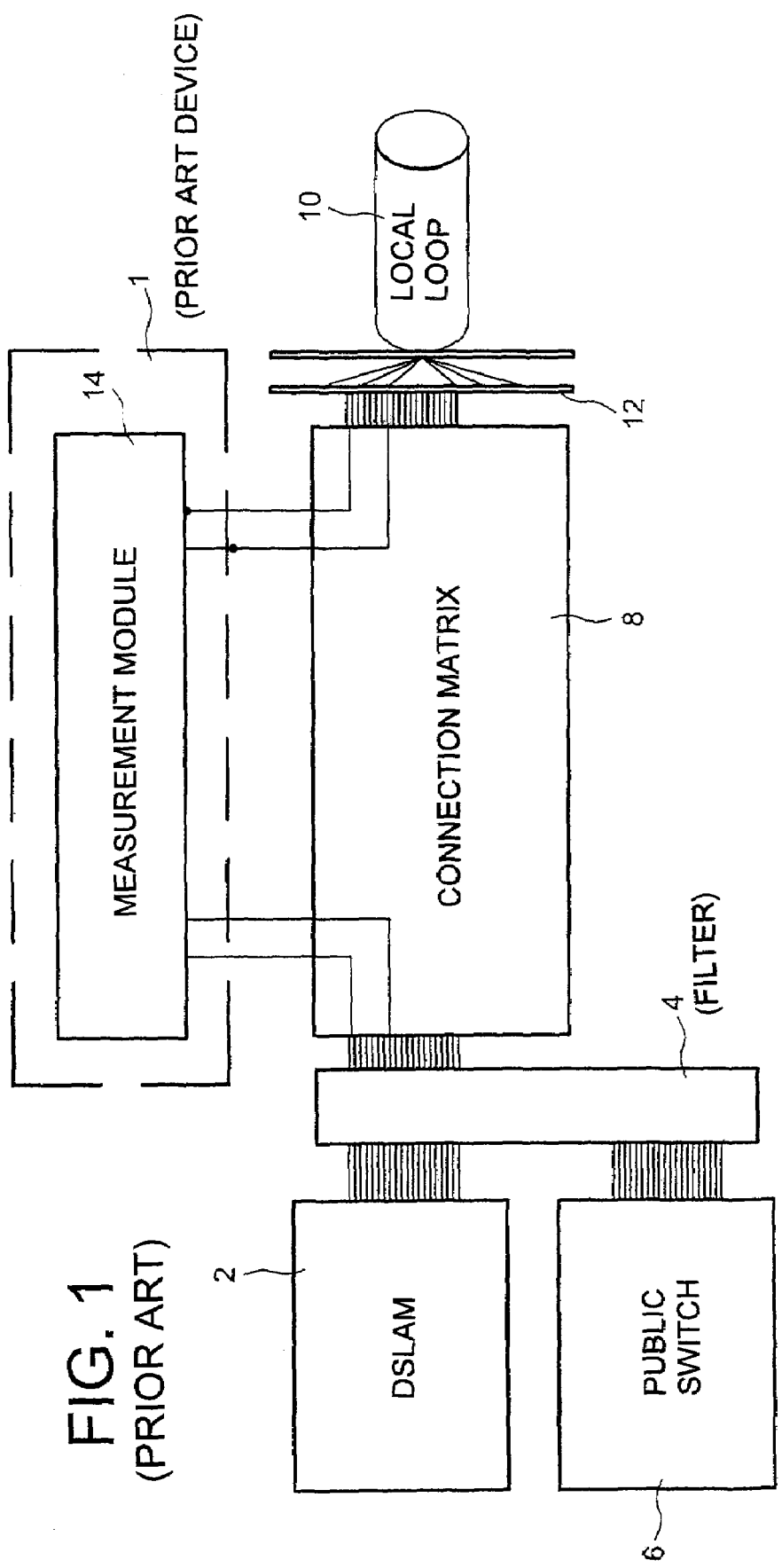
FIG. 1 diagrammatically illustrates functional blocks making up an ADSL line.

FIG. 1 described above illustrates an ADSL line.

Figure 2:
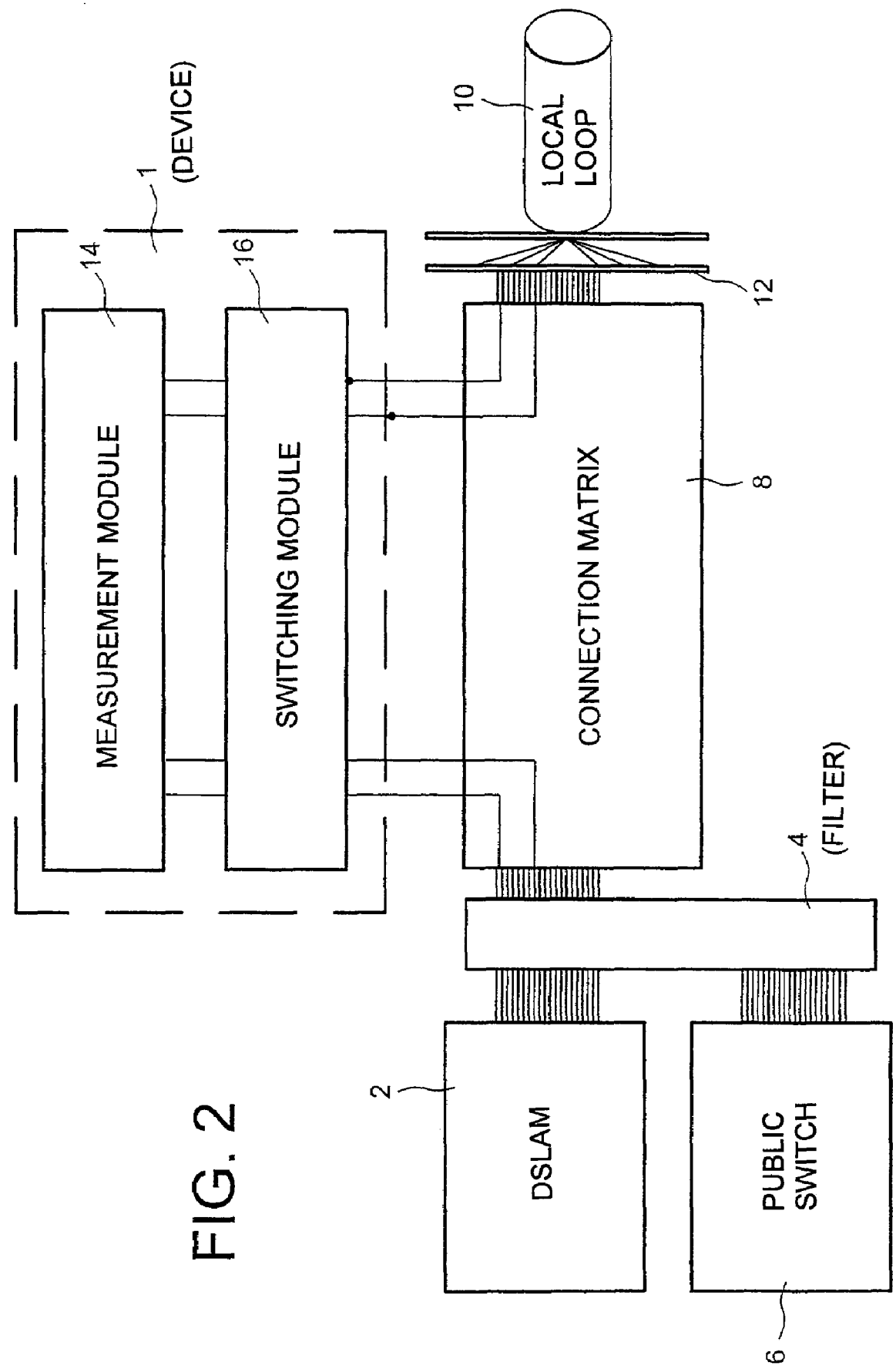
FIG. 2 diagrammatically illustrates a first preferred embodiment of a device according to the invention, FIG. 3 diagrammatically illustrates a preferred embodiment of a device according to the invention.

With reference to FIG. 2, the switching module 16 is composed of a digital filter that could be configured as a function of the check type being made on the line. This filter may be programmed so as to maintain a narrow band link between the public switch 6 and the local loop 10 and a broadband link between the DSLAM 2 and the measurement module 14. Alternately, this filter can be programmed to selectively connect the public switch 6 to the measurement module 14 while inhibiting the narrow band link between the public switch 6 and the local loop 10 and keeping the broadband link between the DSLAM 2 and the local loop 10.

Figure 3:
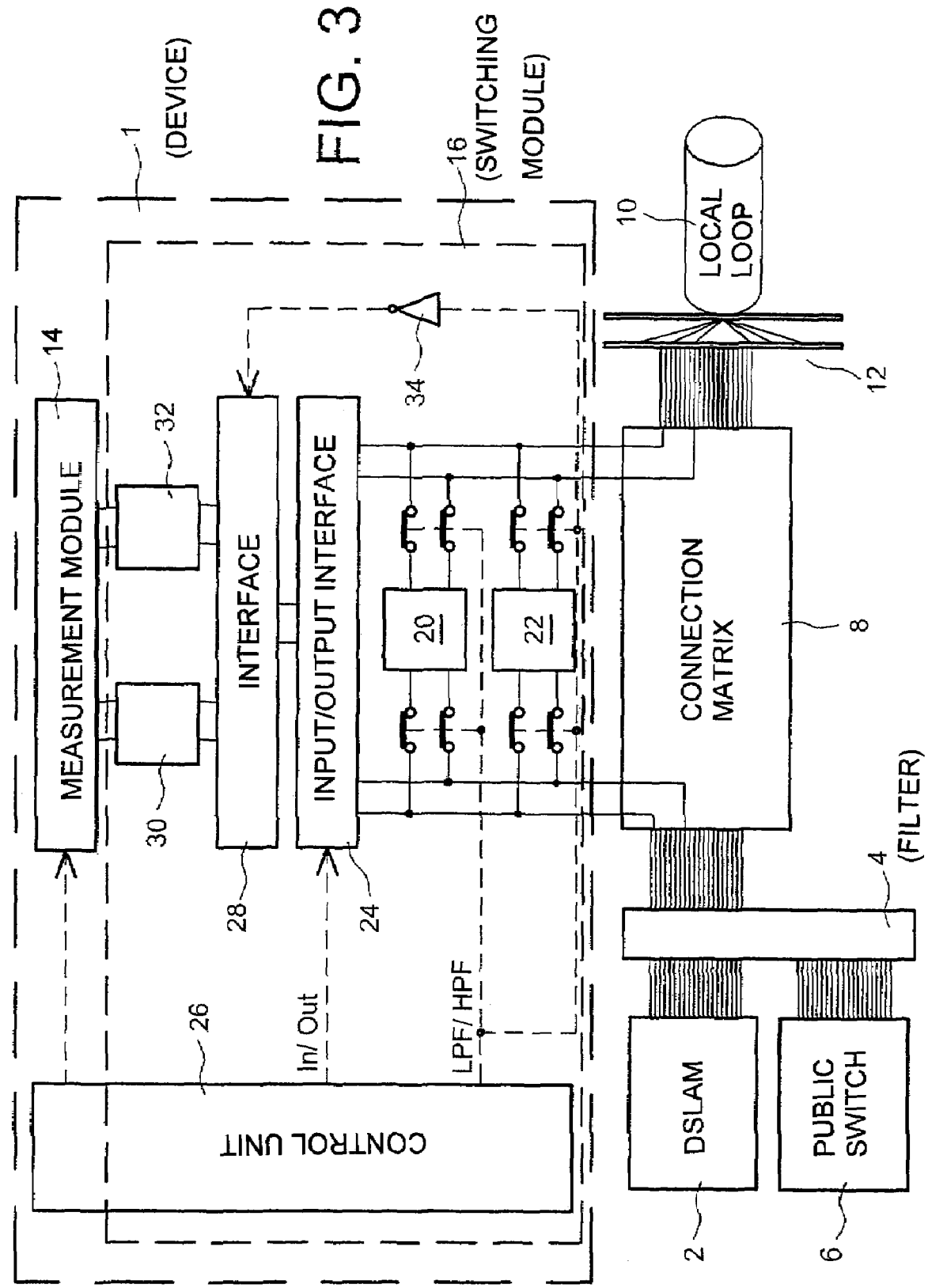

FIG. 3 illustrates a second embodiment in which the switching module 16 comprises a first low pass filter 20 and a first high pass filter 22 installed in parallel with the connection matrix 8. The low pass filter 20 is designed to maintain communication through the telephone channel between the public switch 6 and the local loop 10 when the high speed communication is interrupted to check services supplied through the broadband channel, and the first high pass filter 22 is designed to maintain communication through the broadband channel when the low speed communication is interrupted to check the telephone line.

The low pass filter 20 and the high pass filter 22 are connected through a first input/output interface 24 to a control unit 26 that supplies an LPF signal to activate the low pass filter 20, and an HPF signal to activate the high pass filter 22. A second interface 28 is connected directly to the first interface 24, and also to the measurement module 14 through a second low pass filter 30 and a second high pass filter 32, and receives an LPF signal from the control unit 26 through an inverter 34 when the first interface 24 receives the HPF signal, and similarly receives an HPF signal when the first interface 24 receives the LPF signal, so as to check either the narrow band channel or the broadband channel.

In operation, when the broadband channel has to be checked, the control unit 26 sends an LPF signal to the first interface 24 to activate the first low pass filter 20. At the same time, the second interface 28 receives an HPF signal through the inverter 34 to activate the second high pass filter 32 so that the link through the telephone channel is maintained while the measurement module 14 receives only the broadband channel.

Alternately, when the narrow band channel is to be checked, the control unit 26 sends an HPF signal to the first interface 24 to activate the first high pass filter 22. At the same time, the second interface 28 receives an LPF signal through the inverter 34 to activate the second low pass filter 30 such that the link through the broadband channel is maintained while the measurement module 14 only receives the telephone channel.

Thus, by activating the first low pass filter 20 and the second high pass filter 32 simultaneously, the device according to the invention can be used to connect the measurement module 14 to the broadband channel only, while maintaining the link through the narrow band channel, and activating the first high pass filter 22 and the second low pass filter 30 simultaneously, the device can be used to connect the measurement module 14 to the narrow band channel only by maintaining the link through the broadband channel.

The invention claimed is:

1. A device for checking a transmission line carrying a plurality of digital and/or analogue channels comprising:
    a measurement block designed to evaluate performances, search for faults and determine the quality of the line and services transmitted through the transmission line;
    a switching module configured to selectively connect the measurement block only to the transmission channels to be checked and to keep other channels in the transmission line active;
    wherein the switching module comprises:
        a first low pass filter that maintains communication through at least one narrow band transmission channel between a public switch and a local loop;
        a first high pass filter that maintains communication through a broadband transmission channel;
        a second low pass filter connected to the measurement block; and
        a second high pass filter connected to the measurement block,
        wherein the first low pass filter and the second high pass filter are activated simultaneously in order to connect the measurement block only to the broadband transmission channel while maintaining a link through the narrowband transmission channel when the broadband transmission channel is to be checked, and
        wherein the first high pass filter and the second low pass filter are activated simultaneously in order to connect the measurement block only to the narrow band transmission channel while maintaining a link through the broadband transmission channel when the narrow band transmission channel is to be checked.

2. The device according to claim 1, characterised in that the transmission line comprises at least one first broadband transmission channel connecting at least one subscriber to a digital data server and at least one second narrow band transmission channel connecting the subscriber to a telephone network.

3. The device according to claim 1, characterised in that the broadband transmission channel is of an xDSL type and the narrow band transmission channel is a digital or analogue telephone line.

4. The device according to claim 3, characterised in that the switching module comprises a programmable filter configured to selectively connect the measurement block only to the broadband transmission channel and maintain a link with a local telephone loop only through the broadband transmission channel; the programmable filter further configured to selectively connect measurement block only to the narrow band transmission channel and maintain a link with the local telephone loop only through the narrow band transmission channel.

5. A process for checking a transmission line carrying a plurality of digital and/or analogue transmission channels, a process characterised in that it consists of selectively connecting a measurement block only to the broadband transmission channel and maintaining a link with a local telephone loop only through a broadband transmission channel; and further selectively connecting the measurement block only to the narrow band transmission channel and maintaining a link with the local telephone loop only through the narrow band transmission channel, wherein a first low pass filter and a second high pass filter are activated simultaneously in order to connect the measurement block only to the broadband transmission channel while maintaining a link through the narrowband transmission channel when the broadband transmission channel is to be checked, and wherein a first high pass filter and a second low pass filter are activated simultaneously in order to connect the measurement block only to the narrow band transmission channel while maintaining a link through the broadband transmission channel when the narrow band transmission channel is to be checked.

* * * * *